UNITED STATES PATENT OFFICE.

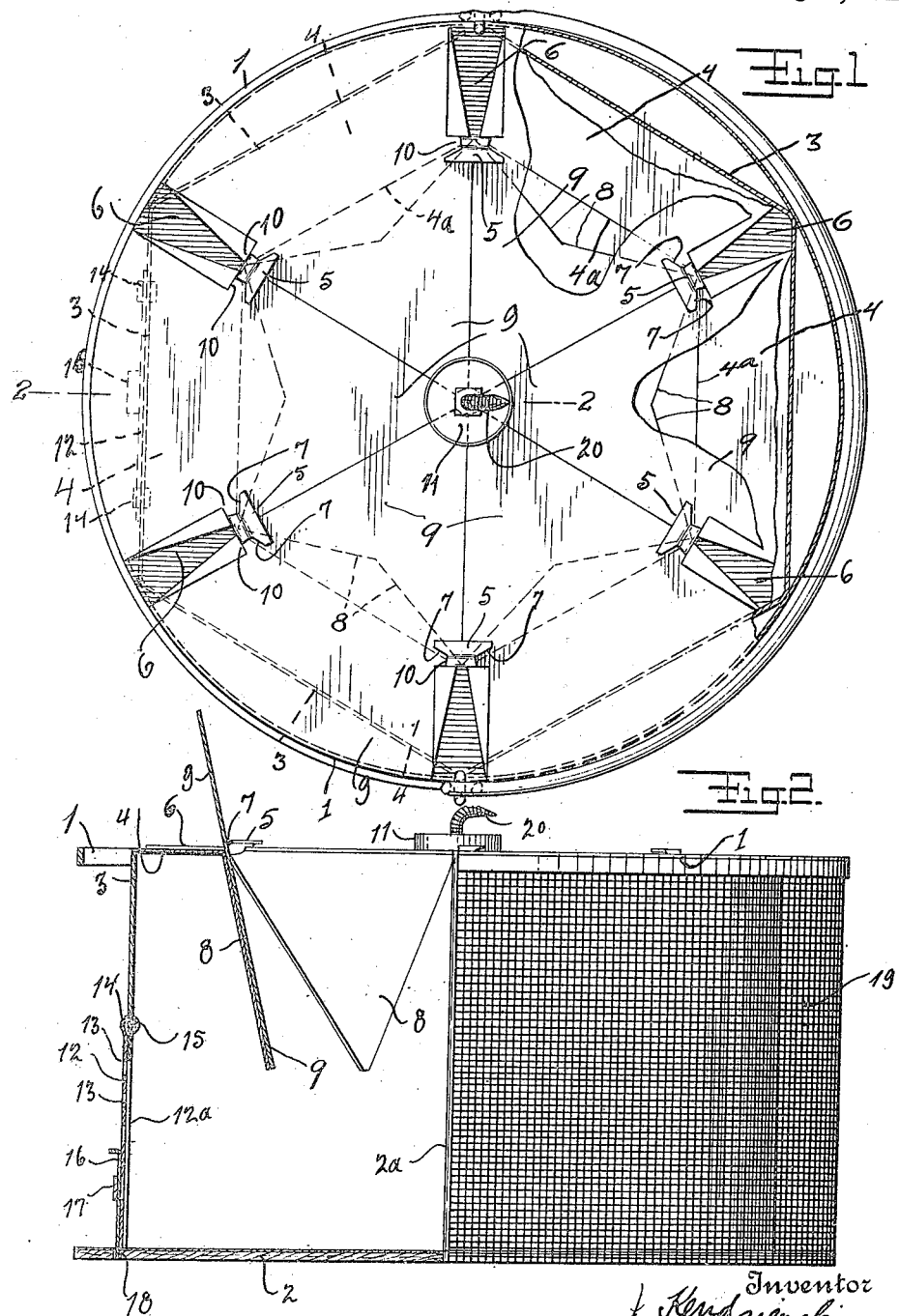

JOSEPH KENDZIERSKI, OF MINNEAPOLIS, MINNESOTA.

ANIMAL TRAP.

1,424,827. Specification of Letters Patent. Patented Aug. 8, 1922.

Application filed April 23, 1921. Serial No. 463,783.

*To all whom it may concern:*

Be it known that I, JOSEPH KENDZIERSKI, a citizen of Poland, residing at Minneapolis, in the county of Hennepin and State of Minnesota, have invented certain new and useful Improvements in Animal Traps, of which the following is a specification.

The main object of this invention is the provision of an animal trap, particularly for mice and rats, which will entrap the animal alive, and which may catch a number of rodents without requiring attention until the capacity of the trap has been attained.

The above and other objects will become apparent in the description below, in which like-named characters of reference refer to like-named parts in the drawings.

Referring briefly to the drawings, Fig. 1 is a plan view of the device.

Fig. 2 is a cross-sectional view taken on the line 2—2 of Fig. 1.

Referring in detail to the drawings, the numeral 1 represents the upper circular frame band and 2 the lower circular frame or base plate, having secured between them a multagonal wall 3 of tin or the like, a central vertical rod $2^a$ aiding to hold the upper and lower frames rigid. A multagonal disk, 4 having a similar multagonal recess cut from the center, is secured at its corners to the wall 3 at the top of the latter. Over the adjacent corners of the members 4 are laid flat members 6 having tongues 5 extending just beyond the edge of the disc 4, each tongue having two edges 7 parallel to the two adjacent edges of the disc 4. Ears 8, integral with the member 4, extend downward at an angle from the member, and their lower ends are pointed as shown.

Shutters 9 are mounted upon the member 4, their opposite edges lying upon the edges of adjacent members 6. Recesses 10 are cut from the sides of the shutters 9, through which the sides of the tongues 5 pass, so that each of the shutters are pivotally mounted upon opposite edges of adjacent tongues 5. A circular cap 11, is rigid with the rod $2^a$ at the upper extremity of the latter, and overlaps the inner, pointed ends of the members 9.

A trap door 12 is hingedly attached to one of the sides of the wall 3 above an opening $12^a$, by means of an eyelet 14 passing through the wall and engaging a fixed rod in the wall. This door is provided with a plurality of vents 13, and a tongue 16 is slidably mounted on said door through a band 17 cut out of the door, the tongue being engageable with a slot 18 in the base 2 in order to lock the door and a screen 19 surrounds the entire wall 3 except at the angular side containing the door 12.

In use, bait is secured to the extension 20 of the rod $2^a$. The rodent, attracted by the bait, will attempt to reach it, and in doing so will pass over one or more of the members 9. Thus the inner ends of the latter will give way, and the rodent will fall into the trap. When the weight of the rodent has been removed from the members 9, they will return to their original positions by gravity. The members 9, in being rotated by the weight of the rodent, are prevented from swinging too far by the edges 7 of the tongues 5, and also by the ears 8.

In removing the entrapped rodents, the door 12 is opened in an obvious manner by raising the tongue 17.

I claim:

A trap comprising upper and lower frames, a multagonal wall disposed vertically therebetween, a multi-recessed disc secured at the corners of said wall, tongues extending radially inward from the corners, shutter-like doors pivotally mounted on the inner ends of said tongues, said doors being depressed by weight, stops limiting the movement of said doors, gravity operated means for returning said doors to their initial positions, and operable means for obtaining access through said wall.

In witness whereof I affix my signature.

JOSEPH KENDZIERSKI.